United States Patent
Stover et al.

(10) Patent No.: US 7,871,522 B2
(45) Date of Patent: Jan. 18, 2011

(54) HYBRID RO/PRO SYSTEM

(75) Inventors: Richard L. Stover, Oakland, CA (US); Gonzalo G. Pique, Oakland, CA (US)

(73) Assignee: Energy Recovery, Inc., San Leandro, CA (US)

( * ) Notice: Subject to any disclaimer, the term of this patent is extended or adjusted under 35 U.S.C. 154(b) by 120 days.

(21) Appl. No.: 12/268,225

(22) Filed: Nov. 10, 2008

(65) Prior Publication Data

US 2009/0071902 A1 Mar. 19, 2009

Related U.S. Application Data

(63) Continuation of application No. PCT/US2007/068761, filed on May 11, 2007.

(60) Provisional application No. 60/747,153, filed on May 12, 2006.

(51) Int. Cl.
B01D 61/00 (2006.01)
B01D 63/00 (2006.01)

(52) U.S. Cl. ............... 210/652; 210/644; 210/195.2; 210/257.2; 417/404

(58) Field of Classification Search ............... 210/644, 210/652, 195.2, 257.2; 417/404; 60/649
See application file for complete search history.

(56) References Cited

U.S. PATENT DOCUMENTS

| 3,906,250 | A | | 9/1975 | Loeb | |
|---|---|---|---|---|---|
| 4,193,267 | A | * | 3/1980 | Loeb | 60/649 |
| 6,017,200 | A | | 1/2000 | Childs et al. | |
| 6,110,375 | A | * | 8/2000 | Bacchus et al. | 210/652 |
| 6,185,940 | B1 | | 2/2001 | Prueitt | |
| 7,201,557 | B2 | | 4/2007 | Stover | |
| 2005/0072152 | A1 | | 4/2005 | Suzuki et al. | |
| 2009/0104046 | A1 | * | 4/2009 | Martin et al. | 417/65 |

FOREIGN PATENT DOCUMENTS

| JP | 2003-176775 | 6/2003 |
|---|---|---|
| WO | WO 02/13955 | 2/2002 |
| WO | WO 2005/017352 | 2/2005 |

OTHER PUBLICATIONS

Loeb, "Energy production at the Dead Sea by pressure-retarded osmosis: challenge or chimera?", Desalination, vol. 120 (1998), pp. 247-262.
Loeb, "Large-scale power production by pressure-retarded osmosis, using river water and sea water passing through spiral modules", Desalination, vol. 143 (2002), pp. 115-122.

* cited by examiner

*Primary Examiner*—Ana M Fortuna
(74) *Attorney, Agent, or Firm*—Fitch, Even, Tabin & Flannery (57) ABSTRACT

A system which includes a separation element (11) employing semipermeable membrane material (17), which system is designed so that it can operate either in an RO mode to produce high quality water or in a PRO mode to generate power from two aqueous solutions of different salt concentrations. In a preferred embodiment, a rotary pressure transfer device (29) is included to transfer pressure from an outlet stream exiting the separation element to an inlet stream being supplied to the separation element.

19 Claims, 3 Drawing Sheets

HYBRID RO/PRO SYSTEM

CROSS REFERENCE TO RELATED APPLICATIONS

This application is a continuation of International Application No. PCT/US2007/068761, filed May 11, 2007, which claims priority from U.S. Provisional Patent Application No. 60/747,153, filed May 12, 2006, the disclosures of both of which are incorporated herein by reference.

This invention relates to systems for employing semipermeable membranes in a device of a character such that osmotic pressure will drive water through the membrane from a dilute solution to a concentrated solution in a PRO mode of operation to generate power, and such that, when hydraulic pressure is used to overcome the osmotic pressure difference across the membrane in an RO mode of operation, a flow of high quality water through the membrane will be effected.

BACKGROUND OF THE INVENTION

U.S. Pat. No. 3,906,250 to Sidney Loeb disclosed the basic concept of using liquids of different osmotic pressures to generate power, suggesting that combinations such as seawater and fresh water, or highly saline bodies (such as the Dead Sea) and seawater, as well as other similar pairs of liquids, might be likely candidates for such a renewable energy generation program. This process has now become known as Pressure-Retarded Osmosis (PRO). In the Loeb patent, a number of systems were described that might be used where such natural sources of liquids having two widely different osmotic pressures were unavailable. U.S. Pat. No. 3,978,344 describes such a PRO system where the high pressure, now diluted, high salt concentration liquid was discharged through nozzles to drive turbines.

Since that time there have been a number of U.S. patents issued and articles written describing how PRO systems might be advantageously used as a renewable energy source to generate power, e.g. electrical power, employing naturally available water sources of widely varying salt concentration, or employing the available discharge streams of industrial or municipal installations, such as waste treatment effluents. See, for example, *Energy Production at the Dead Sea by Pressure-Retarded Osmosis: Challenge or Chimera* by Sidney Loeb, 15 Jul. 1998, Desalination 120 (1998) 247-262; U.S. Pat. No. 6,185,940 B1 issued Feb. 13, 2001 to Prueitt; International Patent Publication No. WO02/13955 A1 published 21 Feb. 2002 to Statkraft SF; and International Patent Publication No. WO2005/017352 A1 published 24 Feb. 2005 to University of Surrey. However, despite the desirability of such proposed systems and despite the fact that large-scale reverse osmosis (RO) facilities for creating fresh water from seawater or saline water sources are in increasingly common use worldwide, such PRO systems have not become commercial. It is believed that the large capital cost involved to build a plant has deterred commercial acceptance of such systems as an alternative to other renewable energy generation sources which have proven track records. As a result, the search has continued for ways to make PRO systems more commercially attractive.

SUMMARY OF THE INVENTION

It has now been found that, by designing an installation that can operate either as an RO fresh water generator or as a PRO power generator, there are surprising advantages that result which are expected to provide commercial opportunities for such installations. Such a system is herein provided which can operate efficiently and economically in either an RO mode or a PRO mode; it is referred to as a hybrid RO/PRO system because, in both modes of operation, the same bank of membrane elements and equipment is used wherein there will be water flow through a semipermeable membrane between two bodies of different salt concentrations. In a preferred embodiment, the overall efficiency of such a system is enhanced through the incorporation of a rotary pressure transfer device which provides simplified overall control of the system and very efficiently pressurizes a saline feed stream being supplied to the semipermeable membrane material elements or cartridges in either mode.

In a particular aspect, the invention provides a system for alternately either producing high quality water from saline water or producing power from two aqueous streams of different salt concentrations, which system comprises a semipermeable membrane element capable of operating in either an RO or a PRO mode, which element has a first subchamber and a second subchamber separated by semipermeable membrane material, said element also having an inlet and an outlet connected to said first subchamber and first and second ports connected to said second subchamber, a hydroturbine power generator, first conduit means connecting said outlet from said first subchamber of said element to said hydroturbine, means for delivering a liquid feedstream of high salt concentration water from a source of such saline water under high pressure which includes a second conduit leading to said first subchamber inlet, third conduit means having first and second branches connected to said first port of said second subchamber, means for supplying low salt concentration water to said second subchamber through said first branch, while said second branch serves as a discharge tube for aqueous permeate, means for withdrawing some low salt concentration water from said second port of said second subchamber to achieve sweeping flow along said semipermeable membrane material, and control means for operating said system either in a power-producing PRO mode wherein said first branch operatively connects said low salt concentration water supply means to said first port of said second chamber, or in a high quality water-producing RO mode wherein said second discharge branch is operatively connected to said second subchamber for flow of permeate therethrough.

In another particular aspect, a method for alternately either producing high quality water from saline water in an RO mode or for producing power from two aqueous streams of different salt concentrations in a PRO mode, which method comprises the steps of providing a semipermeable membrane separation element capable of operating in either an RO or a PRO mode, which element has two subchambers that are separated by semipermeable membrane material, and a pair of ports connected respectively to each said subchamber; in the PRO mode: supplying an inlet liquid stream of a high salt concentration aqueous solution under a pressure which is not greater than about 90% of the osmotic pressure difference between said two aqueous streams to one of said subchambers, supplying an inlet liquid stream of a low salt concentration aqueous solution to the other of said subchambers of said element under low pressure, withdrawing an amount equal to at least about 10% of the inlet flow of said low salt concentration stream from said other subchamber to avoid salt concentration polarization adjacent said semipermeable membrane material, and delivering at least some of a liquid stream of amplified volume exiting said one subchamber to a hydroturbine power generator; and in the RO mode: supplying a continuous liquid stream of high salt concentration aqueous solution under a pressure of at least about 700 psig to one subchamber of said semipermeable membrane element, withdrawing a continuous stream of aqueous permeate from the other subchamber of said semipermeable membrane element, withdrawing a continuous stream of brine from the one subchamber equal to a volume of at least about 40% of the inlet stream volume thereto, and (a) directing said withdrawn stream of brine to the hydroturbine, and/or (b) transferring the pressure of the withdrawn brine stream to raise the pressure of said high salt concentration liquid being supplied to the one subchamber.

In a further particular aspect, the invention provides a method for alternately either producing high quality water from saline water in an RO mode or for producing power from two aqueous streams of different salt concentrations in a PRO mode, which method comprises the steps of providing a semipermeable membrane separation element capable of operating in either an RO or a PRO mode, which element has first and second liquid subchambers that are separated by semipermeable membrane material, and pairs of ports connected respectively to each said subchamber; providing a rotary liquid pressure transfer device having a high pressure inlet port, a low pressure inlet port, a high pressure outlet port and a low pressure outlet port; supplying a continuous incoming liquid stream of high salt concentration aqueous solution to said low pressure inlet port of said pressure transfer device; in the PRO mode: supplying a liquid feedstream of high salt concentration aqueous solution under a pressure which is not greater than about 90% of the osmotic pressure difference between said two aqueous streams to said first subchamber through a first port thereof, supplying a continuous liquid stream of low salt concentration aqueous solution to the second subchamber of said element through a first port thereto under low pressure, withdrawing an amount equal to at least about 10% of the inlet flow to the second subchamber to avoid salt concentration polarization adjacent said semipermeable membrane material, delivering a stream of amplified volume exiting from a second port of the first subchamber to a hydroturbine power generator and to the high pressure inlet port of the rotary liquid pressure transfer device, and regulating the flow being delivered so that a volume of liquid about equal to the volume that flows across the semipermeable membrane is directed to said hydroturbine which operates to generate power, with the remainder of said volume being directed to said high pressure inlet port, and delivering the pressurized stream of high salt concentration aqueous solution from said high pressure outlet port of said rotary pressure exchange device to said first subchamber as said incoming supply; and in the RO mode: supplying a continuous liquid stream of high salt concentration aqueous solution under a pressure of at least about 700 psig to said second subchamber, withdrawing a continuous stream of aqueous permeate from said first subchamber, withdrawing a continuous stream of brine from said second chamber equal to a volume of at least about 40% of the inlet stream volume thereto, directing said withdrawn stream of brine to the high pressure inlet port of the rotary pressure transfer device where it raises the pressure of said incoming stream of high salt concentration aqueous solution, and boosting the pressure of said stream exiting the high pressure outlet port of the rotary pressure transfer device and combining same with a makeup stream of high salt concentration aqueous solution to constitute said supply of high concentration aqueous solution to said second subchamber, whereby water permeates through the semipermeable membrane material in the same direction in both the RO and PRO modes, so that in an RO mode high quality water is efficiently provided, and in a PRO mode power is generated.

DETAILED DESCRIPTION OF THE PREFERRED EMBODIMENTS

Figure 1:
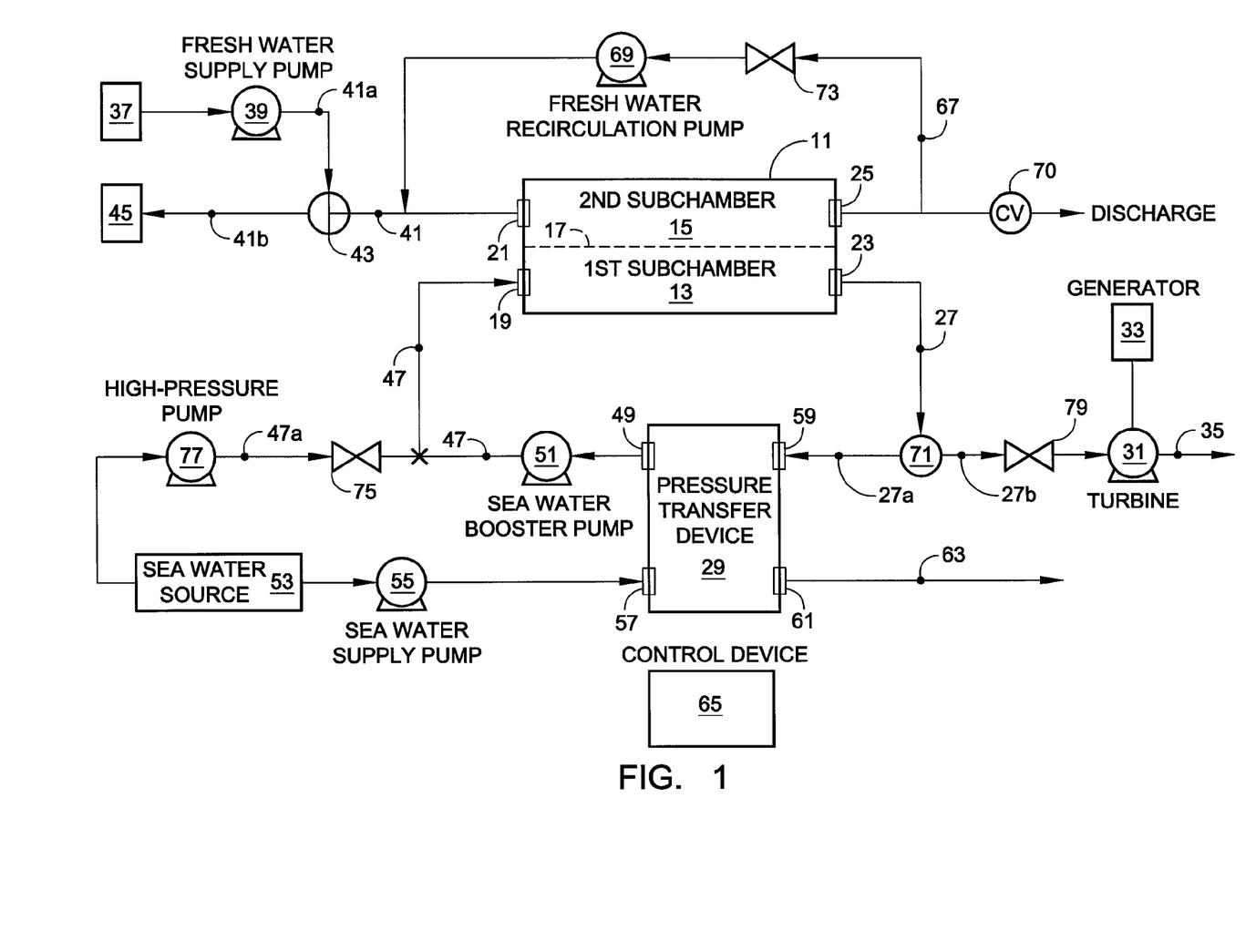
FIG. 1 is a schematic view showing a hybrid RO/PRO system embodying various features of the present invention.
Figure 2:
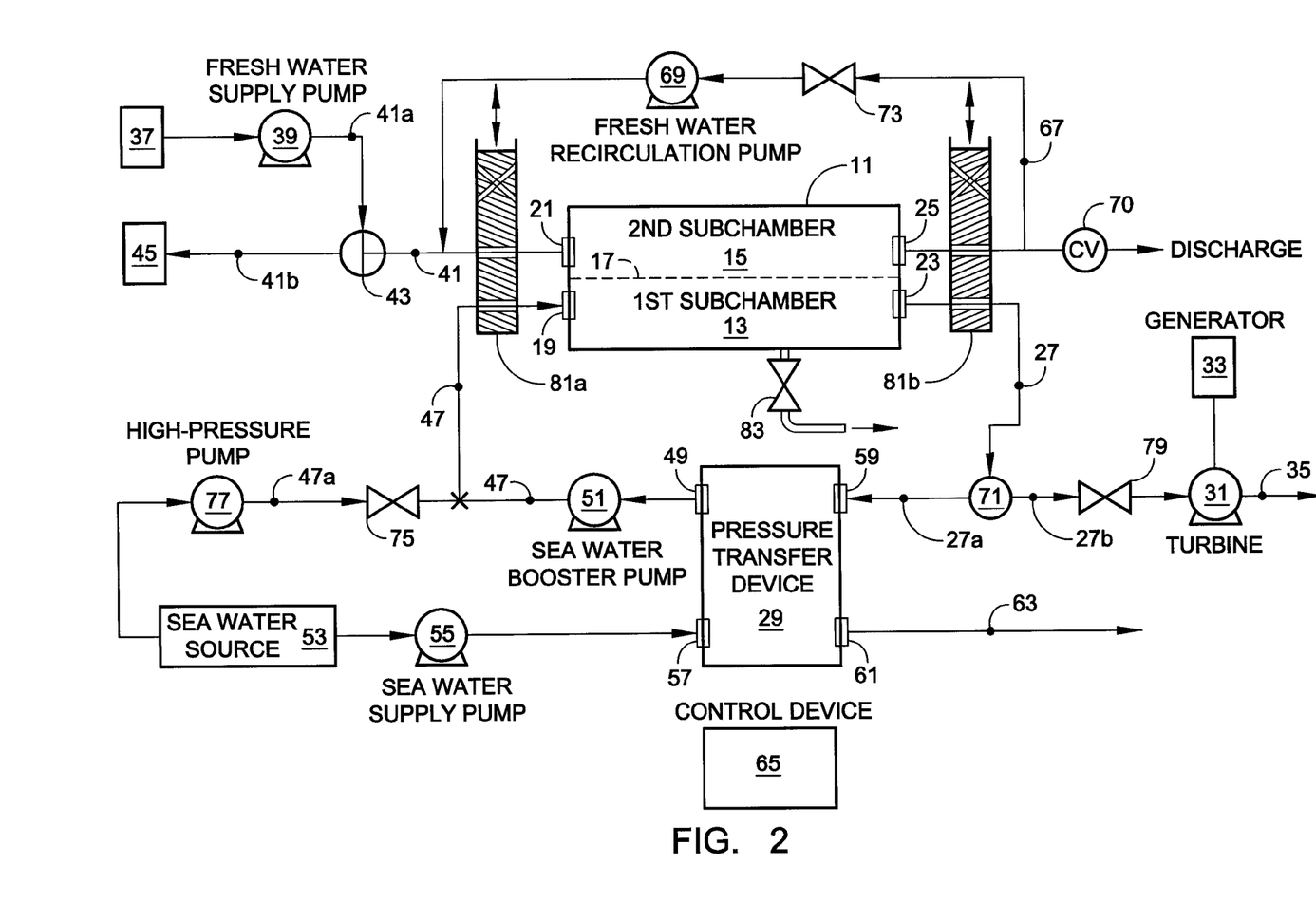
FIG. 2 is a schematic view of an alternative embodiment of a hybrid RO/PRO system embodying various features of the present invention.
Figure 3:
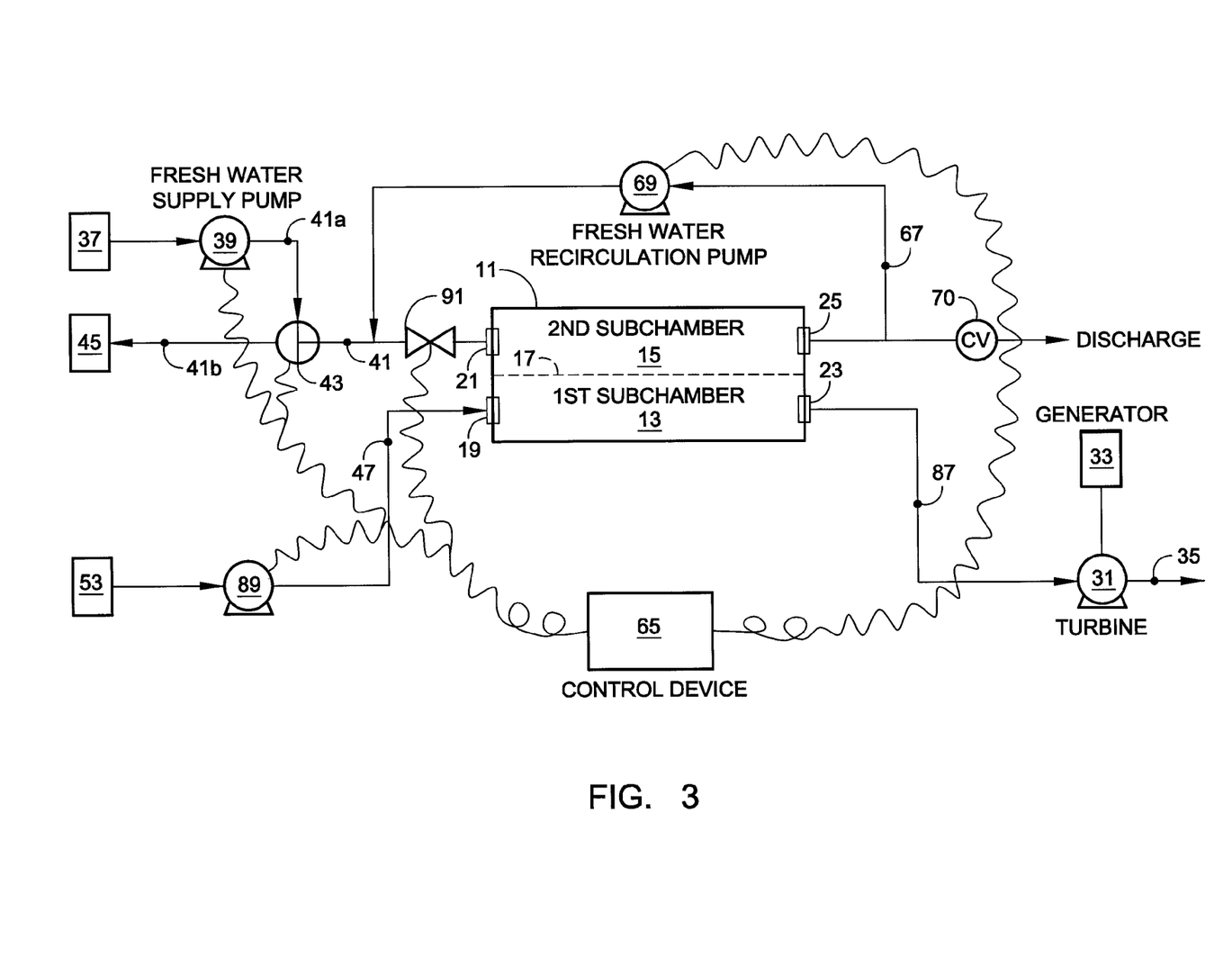
FIG. 3 is a schematic view of another alternative embodiment of a hybrid RO/PRO system embodying various features of the present invention.

The invention utilizes a separation element or cartridge that employs semipermeable membrane material of a character such that, in the PRO mode, water from a lower salt concentration stream will permeate through the membrane to dilute and thereby reduce the salt concentration of an aqueous solution of higher salt concentration, whereas in the RO mode, water will permeate through the membrane from the higher pressure saline solution. For purposes of this application, the term low salt concentration or low salinity is used to define a stream of relatively low or substantially no salt concentration, which may be naturally available fresh or brackish water or water that permeates through the semipermeable membrane material during the RO mode. The term is used to describe the stream that is fed to the low pressure side of a membrane in a PRO mode; thus, it may include a former permeate stream or even seawater. While the permeate that results from operation in the RO mode stream will often be of a quality such as to be potable, such need not be the case; potability may depend, for example, upon the specific performance characteristics of the semipermeable membrane material that is used and perhaps those of the feed solution in an RO mode. The high quality water permeating the membrane in the RO mode may be equated to fresh water. In FIGS. 1-3, the term fresh water stream is used to represent the low salinity stream, and the term seawater is used to represent the high salt concentration or high salinity stream.

There are a wide variety of separation element constructions that use semipermeable membrane material for this purpose; for example, these include hollow fibers, sheet material wrapped in a spiral fashion about a central core, plate-and-frame and tube-and-shell arrangements. Any of these constructions may be employed, and the types of membranes used may vary. Hollow fiber separation elements may have advantages in some systems, whereas other constructions, e.g. spiral-wound elements, may have advantages in others. There are various different constructions known for spiral-wound elements presently used in RO crossflow filtration. In the most common, spiral-wound crossflow RO element construction, there is a highly porous feed sheet layer located against the discriminating surface of the commonly used membranes, and the flow characteristics of the element that will be redesigned for use in PRO applications may be such that the inlet stream that is being decreased in volume as a result of permeation is best directed to that feed layer in both the PRO and RO modes, as a result of which water flow will always be in the same direction through the membrane material during operation. In the FIG. 1 embodiment, the semipermeable membrane separation element is one that is designed to allow efficient aqueous flow through the membrane material in either direction. In the FIG. 2 embodiment, the flows of the two incoming high and low salt concentration streams are switched so that the stream that is being decreased in volume is supplied to the same side of the semipermeable membrane material in the element in the RO mode and in the PRO mode. In the latter instance, water flow through the membrane will always be in the same direction, which may be advantageous from the standpoint of membrane character and/or element flow characteristics.

Generally, the two aqueous solutions being fed to the separation element in the PRO mode will vary in salt concentration by at least about 2%, and preferably by at least about 3%. For example, fresh water from a river, lake or other ground water source or brackish water which is only slightly saline may be used as a low salt concentration stream in combination with seawater or a more saline stream. Alternatively, seawater, which usually contains about 3% salt, might be used opposite an aqueous brine solution that contains a higher salt concentration, e.g. from about 5% to about 10% salt. Generally, when operating in an RO mode, as well known in the art, the feed liquid is brackish water or seawater.

In the preferred embodiments shown in FIGS. 1 and 2, the system employs a pressure transfer device to enhance the overall operation efficient in either mode and to significantly improve the economics of the system. FIG. 3 illustrates a more basic system that does not incorporate such a device. When such a device is included, any suitable isobaric pressure transfer device may be employed, e.g. one of the type shown in U.S. Pat. No. 6,017,200; however, the preferred devices are those of the rotary type shown in U.S. Pat. Nos. 4,887,942; 5,338,158; 6,540,487; and 6,659,731. These isobaric pressure transfer devices have a high pressure inlet port, a high pressure outlet port, a low pressure inlet port, and a low pressure outlet port. The rotary devices have a cylindrical rotor that rotates at high speed; a plurality of channels extend longitudinally through the rotor are alternately supplied with liquid in an amount equal to about 40%-75% of their volume, first at one end and then at the other end, while liquid at about the respective supply pressures is being discharged out the opposite end in the same amount. In this fashion, the elevated pressure of a high pressure stream of liquid is extremely efficiently transferred to a low pressure stream, with the high pressure liquid consequently being depressurized, e.g. to about atmospheric pressure in most instances.

Many portions of the FIG. 1 and FIG. 2 embodiments are similar, and the same reference numerals are used for both in such instances. More particularly, the rotary pressure transfer device used in both FIG. 1 and FIG. 2 is exactly the same.

In the system illustrated in FIG. 1, a separation membrane element or cartridge 11 is shown which embodies a first subchamber 13 and a second subchamber 15 separated by semipermeable membrane material 17, all shown schematically in the drawing. An inlet 19 provides access to the first subchamber, and a first port 21 provides access to the second subchamber. The first subchamber 13 has an outlet 23, and the second subchamber has a second port 25. The outlet 23 from the first chamber is connected to a first branched conduit 27, wherein a first branch 27a leads to a pressure transfer device 29, and a second branch 27b leads to a hydroturbine 31 which produces usable power, such as by driving an electrical generator 33. A feedstream of seawater or the like is supplied to the first subchamber 13 through a second branched conduit. Although the discharge stream 35 from the hydraulic turbine 31 or other discharge streams may be appropriately returned to a source of highly saline water so long as precautions are taken to avoid salinity shock, there may be advantages in the use of some discharge streams for other purposes.

Usually either fresh water or water of relatively low salinity is fed as an inlet stream of low salt concentration liquid to the first port 21 of the second subchamber 15 when operating in the PRO mode. The terms low salt concentration or low salinity stream and high salt concentration or high salinity stream are generally used throughout; however, it should be understood that these terms are relative to each other in each specific operation. Thus, the low salt concentration stream may be fresh water having substantially no salt concentration, or it may be a slightly saline stream, or even seawater when the high salt concentration stream is one of substantially greater salt concentration, for example, a stream from the Great Salt Lake. Likewise, the high salt concentration stream may be seawater when the low salt concentration stream is fresh water. For example, water may be supplied from a source 37 of fresh water which is connected to the intake of a low pressure pump 39 that discharges into one branch 41a of a third branched conduit 41 that contains a three-way valve 43. A second branch 41b of this branched conduit leads from the three-way valve 43 to a fresh water reservoir 45, and flow is directed to this reservoir when the system is operating in the RO mode. The supply pump 39 may also take suction from the reservoir 45.

A feed conduit 47 leading to the inlet 19 to the first subchamber 13 of the element is part of the second branched conduit and connected at its opposite end to a high pressure outlet port 49 from the rotary pressure transfer device 29, and this line contains a booster pump 51 designed to slightly additionally raise the pressure of the high salt concentration liquid flow supplied to the inlet. The supply of high salt concentration liquid is provided by pumping from a suitable source 53 by a low pressure pump 55 which discharges into a low pressure inlet port 57 of the pressure transfer device 29. The branch 27a from the first subchamber 23 outlet leads to a high pressure inlet port 59 of the pressure transfer device, and a low pressure outlet port 61 is connected to a discharge conduit 63 which can be combined with the discharge stream 35 and used or discharged together.

Exemplary operation of the FIG. 1 system in a PRO mode is hereinafter first described. A controller or control device 65 starts up the motor-driven, low pressure pumps 39 and 55; the booster pump 51 may start automatically when it senses a desired minimum intake pressure or it may be individually started following one or both of the pumps 39 and 55. The first and second subchambers 13, 15 of the separation element 11 are thus filled with high salt concentration and low salt concentration water, respectively, and the phenomenon of osmosis drives the water through the membrane 17 and into the first subchamber 13 to dilute the solution. For the process to be effective, the pressure of the liquid in the first subchamber cannot exceed the pressure in the second subchamber by more than the difference in osmotic pressures of the two liquids, as well known in the PRO art. Preferably a pressure is used which is not greater than about 90% of the osmotic pressure difference between said two aqueous streams, and which is at least about 300 psig, if appropriate. Because some buildup of salt concentration may occur on the inflow side of the membrane even if a fresh water stream is used, driven by concentration gradients, some sweeping circulation across the semipermeable membrane material 17 on the low pressure side is provided to limit such potential concentration polarization, preferably by connecting the second port 25 of the second subchamber 15 to a recirculation line 67 which contains a small recirculation pump 69 that is operated to return a small flow of liquid for recirculation along with the liquid being pumped from the source 37, preferably delivering such to the conduit 41 downstream of the 3-way valve 43. Depending upon the character of the inflow to the second subchamber and the amount of flow into the second chamber, the flow being withdrawn is preferably equal to at least about 10% of flow rate of liquid supplied by the low pressure pump and more preferably equal to at least about 20%. In addition, because of concentration gradient salt intrusion and because even fresh water may have some salt content, to avoid any undesirable significant increase in the bulk salt concentration in the second chamber as a result of the permeation of water through the membrane, at least a portion of the withdrawn stream is bled to a discharge line, preferably an amount at least about equal to about 2% and more preferably at least about 5% of the inflow supplied by the low pressure supply pump 39. A greater percentage of the recycle stream might be bled off when the low concentration stream has a somewhat greater salt content. This is readily achieved by including a tee in the recirculation line 67 which leads to discharge through a control valve 70 that can be variably set to allow a desired amount of flow therethrough. The amount of flow from the second chamber that is bled to avoid such increase in salt concentration of course functions as part of the sweeping flow and decreases the amount of the withdrawn flow that is returned to the inlet to the second chamber.

Water permeating through the membrane material 17 is additive to the inlet flow into the first subchamber 13 so that the outlet flow therefrom is substantially greater, usually by about 40-50%. The output flow from the first chamber 13 in the branched conduit 27 may be controlled via a suitable flow controller 71 at the tee to set the desired amounts of flow through each branch; however, when a rotary pressure transfer device is included as in FIGS. 1 and 2, control of the booster pump 51 to supply a defined flow rate of high salt concentration liquid to the first subchamber will control the remainder amount of flow that is directed to the hydroturbine. With such control, a continuous rate of liquid flow is maintained in the branch 27a that is just slightly greater than the rate of inlet flow of high salt concentration liquid being supplied to the separation element 11, allowing for a very slight loss through the liquid seals in the rotary device 29. The remainder of the flow from outlet 23 is shunted to the branch 27b leading to the hydroturbine 31 where it drives the turbine and results in generation of electrical energy. Generally a major portion of the discharge flow enters the high pressure inlet port 59 of the rotary pressure transfer device 29, wherein it transfers its pressure to the incoming stream of low pressure, high salt concentration liquid being supplied by the low pressure pump 55. This now depressurized, diluted stream is then discharged, usually at about atmospheric pressure, along with the similar discharge stream 35 from the hydroturbine, to a suitable body of water; such may be the same seawater source 53 from which the low pressure pump 55 draws its suction.

As an example of one typical operation, the low pressure fresh water pump 39 is run to supply a stream at about 15 psig, and the low pressure pump 55 for the high salt concentration liquid, e.g. seawater, is run to supply liquid to the pressure transfer device 29 at a pressure of about 30 psig. This seawater enters the low pressure inlet port 57 of the pressure transfer device 29, and it emerges from the high pressure outlet port 49 as a stream at about 255 psig. Its pressure is then boosted in the feed conduit 47 by the booster pump 51 to an inlet pressure of about 300 psig prior to its entering into the first subchamber 13 of the membrane separation element. A dilute stream emerges from the outlet 23 of the element 11, at a pressure of about 288 psig, and it is split between the branches leading to the high pressure inlet port 59 and to the hydroturbine 31. At, for example, an inlet flow of 100 gallons per minute (gpm) of seawater and an inlet flow of fresh water of about 51 gpm, with a recirculation flow of about 10 gpm through the line 67, there may be an outlet flow of about 141 gpm to the branched conduit 27 where it is then split so that about 101 gpm is routed to the pressure transfer device 29 and about 40 gpm is employed to drive the hydroturbine 31 and create electrical energy. A portion of the recirculation flow is preferably bled by opening the valve 70 and discharged, as to a ground water source to prevent an undesirable rise in salt concentration in the second subchamber 15. The supply of fresh water from the pump 39 is increased accordingly, e.g. by about 5% to 105 gpm, to compensate for a 5% bleed. The overall operation of the system in the PRO mode is exquisite because, using the rotary pressure transfer device 29, startup is essentially automatic once the two low pressure pumps 39 and 55 and the booster pump 51 are operating; moreover, when such an extremely efficient rotary pressure transfer device is used, the operation is essentially self-controlling as well as self-starting.

When it is desired to operate the system in an RO mode, the control device 65 is set to RO mode, instead of PRO mode, and operation begins as generally in any large scale RO desalination system. As known in the RO art, the saline stream will generally be supplied to the semipermeable membrane separation elements at a pressure of at least about 600 psig, and generally at least about 700 psig and preferably at about 800 psig for seawater. It is contemplated that, for example, during winter months when fresh water may be relatively plentiful as a result of rain and snowfall so no auxiliary supply of fresh water is needed, the system may be operated in a PRO mode to generate useful power. Later in the year, when the supply of fresh water becomes limited, the system can be shifted to operate in RO mode and produce a steady flow of high quality water which should be of a quality for drinking. However, in some respects the system can also be operated as if it were an energy storage device or battery, so that, when excess power is available on the grid, the system is operated in an RO mode to generate high quality water which is stored in a suitable reservoir and concentrated brine which may be stored in a separate basin. Thereafter, when energy is needed, this stored concentrated brine and water can be returned as feed streams to generate energy in a PRO mode or a stream of gray water discharge from a water treatment facility or the like might be used as the low salinity liquid. Moreover, the brine from RO treatment of brackish water might be advantageously retained for later use in a PRO cycle in situations where there is no other high salinity liquid readily available.

When the system is operated in the RO mode, the three way valve 43 is shifted so as to connect the first port 21 of the second subchamber 15 in the separation element to the branch conduit 41b leading to the fresh water reservoir 45, and a valve 73 in the recirculation circuit is closed. Alternatively, a valve (not shown) in the conduit 41 just upstream of the first port 21 and the bleed valve 70 can be closed, and the recirculation pump used to pump the permeate from the second subchamber through the conduit 67 and the branch 41b. Assuming seawater is being used as the high salt concentration liquid feed, it may be fed to the inlet 19 of the first subchamber 13 of the separation element 11 at, e.g., about 800 psig. The inlet conduit 47 leading to the first subchamber 13 includes a branch 47a which enters at a location downstream of the booster pump 51; the branch contains a valve 75 which is closed during PRO operation and then opened by the control device 65 during RO operation. A high pressure pump 77 supplies seawater at about 800 psig from a source, such as the ocean, through the branch 47a. The low pressure pump 55 continues to run and supply seawater at about 30 psig to the low pressure inlet port 57 of the pressure transfer device 29.

In this RO mode, if about 100 gpm of seawater is pumped into the first subchamber 13, reverse osmosis will cause permeation of fresh water through the membrane into the second subchamber 15, and permeate flow out of the second subchamber 15 may be equal to about 40 gpm, which permeate is delivered to the water reservoir 45. The rate of outflow of now increased salinity seawater, often called brine, from the first subchamber 13 through the outlet 23 is thus decreased below the inflow rate of seawater by the amount of permeate, resulting in an exit brine flow rate of about 60 gpm or 60% of inflow. Generally the brine flow rate will be maintained at least about 40% of inflow, preferably at least about 50% and more preferably at least about 60%. As known in the RO art, a control valve (not shown) can be used to maintain the desired pressure in the first subchamber 13. A valve 79 in the line to the hydroturbine 31 is closed, so that the entire flow is directed to the high pressure inlet port 59 of the pressure transfer device 29. In the revolving rotor, the pressure of the exit stream of brine is transferred to about the same volume of fresh seawater being supplied by the low pressure pump 55, and such results in discharge of a high pressure outlet stream of seawater at a pressure of about 755 psig and a flow rate of about 59 gpm. The booster pump 51 raises the seawater pressure to about 800 psig, and the pump 51 may be used to control the brine discharge rate. The boosted pressure flow merges with the output flow from the high pressure pump 77 to provide the desired inlet stream to the separation element 11, i.e., 100 gpm of seawater at 800 psig. The low pressure discharge stream of brine from the outlet port 61 is appropriately discharged or directed to a basin as aforementioned.

Accordingly, through a relatively simple control operation, the overall system is readily converted between either the RO production of fresh water or the efficient and economical PRO generation of usable power, such as electrical energy. This feature accordingly provides an efficient alternative use of an RO desalination plant when natural conditions are such that fresh water supplies are meeting the needs of the community or area; it thus enhances the system's overall economy.

In the FIG. 2 embodiment, the components that are employed are the same; however, in order that water flow through the semipermeable membrane material 17 in the separation element 11 is always maintained in the same direction, regardless of whether in the RO or PRO mode of operation, provision is made for draining the system and activating two crossover valves 81. A valve 81*a* is located in the lines leading to the pair of ports 19, 21, and a similar valve 81*b* is located in the lines leading from the pair of ports 23, 25 of the separation element 11. Both are generally referred to as shuttle valves.

The illustrated FIG. 2 system might operate in PRO mode exactly as described hereinbefore. Then, when it is desired to generate fresh water, the control device 65 would shut down all the pumps, drain the first subchamber 13 through a remote controlled drain spigot 83 after closing the valve 79 leading to the hydroturbine and the valve 65, shift the three-way valve 43, open the valve 75 in the line leading to the high pressure pump, switch the two crossover shuttle valves 81*a* and 81*b*, and then restart the low pressure pump 55, the high pressure pump 77 and the booster pump 51 (if it does not start automatically). The control device 65 shifts the valve 81*a* at the inlet to cause the inlet stream of high pressure, high salt concentration liquid, including that from the pressure transfer device 29, to be supplied instead to the second subchamber 15; this causes water to permeate through the membrane 17 into the first subchamber 13 from which it flows to the water reservoir either through the former inlet port 19 or through the outlet port 23 via the crossover valve 81*b* and the recirculation line 67. The brine exit flow from the second port 25 of the second subchamber 15 is now connected, through the crossover valve 81*b*, to the branched conduit 27 that leads to the high pressure inlet port 59 of the pressure transfer device. The system then operates in RO mode, substantially as previously described, with the only change being that the high salt concentration liquid (e.g. seawater) is now being supplied to the second subchamber 15 through the first port 21 and the permeating fresh water is being discharged from the first subchamber 13. As a result of these changes in routing via the crossover valves 81, the water flow through the semipermeable membrane 17 in the RO mode remains in the same direction, i.e. from the second subchamber 15 to the first subchamber 13, as was described in respect of the PRO mode. When it is desired to switch the system back to the PRO mode, it may be desirable to first drain the second subchamber 15, and opening of the control valve 70 in the recirculation line 67 may be used to achieve this purpose.

FIG. 3 illustrates a hybrid RO/PRO system similar to the system illustrated in FIG. 1, and accordingly, the components that are common to both are given the same reference numerals. Schematic wired connections are shown between the control device 65 and the various components of the system; similar connections, or their equivalents would exist in FIGS. 1 and 2 but are not shown to improve overall clarity. The FIG. 3 system, however, does not employ a pressure transfer device to raise the pressure of an incoming stream of high concentration liquid by employing the high pressure discharge stream of either diluted liquid in the PRO mode or brine in the RO mode. The system is thus somewhat simplified in that an unbranched outlet conduit 87 connects the outlet port 23 from the first subchamber directly to the hydroturbine 31, as a result of which the entire outlet flow of high pressure liquid in both modes is used to create power and then discharged or retained as aforementioned.

The system is also simplified on the seawater inlet side where a single variable pressure pump 89 is connected to the supply conduit 47; the pump can operate to provide a discharge pressure of between about 300 psig and about 800 psig. Alternatively, a low pressure pump and an optional booster pump circuit might be used.

When operation in the PRO mode is desired, the control device 65 is set accordingly, and the 3-way valve 43 is activated so as to connect the line 41*a* containing the fresh water supply pump 39 to the first port 21 of the second subchamber 15, as depicted in FIG. 3. The control device then sets the pump 89 to supply a flow of seawater at the desired rate, e.g. 100 gpm, and pressure, e.g. 300 psig, to the first subchamber 13. Fresh water is supplied to the second subchamber 15 via the supply pump 39, which is actuated along with the recirculation pump 69, and the phenomenon of osmosis drives water through the semipermeable membrane material 17 into the first subchamber 13. A percentage of the withdrawn flow is bled through the valve 70 as before. The permeating water adds to the inlet flow of seawater into the first subchamber, and a discharge flow of increased volume exits through the outlet port 23. The entire flow is directed through the line 87 to the hydroturbine 31 where it generates power and is then discharged as aforementioned.

When it is desired to instead operate the system in the RO mode, the motor-driven pumps are halted, and the control device 65 is shifted to RO mode. This causes the 3-way valve 43 to connect the conduit 41 to the water reservoir 45 through the branch line 41*b*, and it then causes the variable pressure pump 89 to deliver liquid, e.g. seawater, at about 800 psig. A valve 91 just upstream of the first port 15 of the second subchamber and the control valve 70 are closed, and the recirculation pump 69 is operated so as to withdraw the permeate from the second subchamber 15 and deliver it through the 3-way valve 43 to the water reservoir 45 so long as the pump 89 is operating. The entire discharge flow of brine from the first subchamber 13 is delivered through the line 87 to the turbine 31 where it causes the turbine to rotate and generate power, and is then retained or discharged as aforementioned.

Thus, it can be seen that the control device 65 can again very simply and in a straightforward manner switch the system between operation in the PRO mode and operation in the RO mode. This greatly increases the versatility of the system, thus making the construction and operation of a PRO type energy generation system more economically feasible.

Although the invention has been described with regard to certain preferred embodiments which constitute the best mode known to the inventor for carrying out this invention, it should be understood that various changes and modifications as would be obvious to one skilled in the art may be made without departing from the scope of which is defined in the claims appended hereto. For example, in an environment where for the moment there is a copious supply of fresh water, all of the withdrawn stream might be bled to discharge and the supply to the upstream chamber increased accordingly. The retention of certain discharge streams in a basin or the like can both minimize environmental impact of certain discharges, e.g. the more highly saline brine from a seawater RO desalination unit, and provide an advantage in subsequent power generation in the PRO mode. For example, the hydroturbine might be employed to directly or indirectly, e.g. via an electric motor, drive one of the feed pumps, e.g. a low pressure fresh water pump or low pressure seawater pump. In addition to being useful to maintain flow always in the same direction through separation elements utilizing flow-sensitive semipermeable membrane material and/or having particular feed flow preference, the arrangement of FIG. 2 may also be useful when separation elements are employed that are substantially insensitive to direction of flow. In this case, it may be desirable to occasionally switch the shuttle valves of the system shown in FIG. 2 so as to, while operating for example in the PRO mode, effectively switch the chambers so that flow through the semipermeable membrane material is in the opposite direction. Such period flow reversal could facilitate cleaning by removal of the surface buildup on the side of the membrane into which water is permeating.

Particular features of the invention are emphasized in the claims which follow.

The invention claimed is:

1. A system for producing high quality water from saline water or alternately producing power from two aqueous streams of different salt concentrations, which system comprises:
   a semipermeable membrane element capable of operating in either an RO or a PRO mode, which element has a first subchamber and a second subchamber separated by semipermeable membrane, said element also having an inlet and an outlet connected to said first subchamber and first and second ports connected to said second subchamber,
   a hydroturbine power generator,
   first conduit means connecting said outlet from said first subchamber of said element to said hydroturbine,
   means for delivering a liquid feedstream of high salt concentration water from a source of such saline water under high pressure which includes a second conduit leading to said first subchamber inlet,
   third conduit means having first and second branches connected to said first port of said second subchamber,
   means for supplying low salt concentration water to said second subchamber through said first branch, while said second branch serves as a discharge tube for aqueous permeate, and
   control means connected to said high salt concentration water feedstream delivery means and to said low salt concentration water supplying means for alternately operating said system either
   in a power-producing PRO mode wherein said first branch of said third conduit means operatively connects said low salt concentration water supply means to said first port of said second chamber so that water passes through said membrane to dilute high salt concentration water in the first chamber, and wherein at least some of a dilute stream exiting from said first chamber outlet flows through said first conduit means to said hydroturbine generator, or
   in a high quality water-producing RO mode wherein said first branch is closed to flow and said second discharge branch of said third conduit means is operatively connected to said second subchamber for flow of permeate therethrough, which permeate has passed through said membrane from the first chamber to which high salt concentration water is supplied.

2. The system according to claim 1 wherein said feedstream delivery means includes a first low pressure pump and wherein means are included for withdrawing some low salt concentration water from said second port of said second subchamber to achieve sweeping flow along said semipermeable membrane.

3. The system according to claim 2 wherein said withdrawing means includes a recirculation conduit that contains a recirculation pump which is connected to said first and second ports of said second chamber.

4. The system according to claim 3 wherein said third conduit means contains a 3-way valve in a line to said second subchamber which valve in the RO mode allows the recirculation pump to deliver permeating water to said second branch for discharge.

5. The system according to claim 2 wherein said withdrawing means includes means for diverting a portion of low salt concentration water leaving said second chamber to discharge.

6. The system according to claim 1 which includes an isobaric pressure transfer device having a high pressure inlet port, a low pressure inlet port, a high pressure outlet port and a low pressure outlet port, wherein said first conduit means includes a branch which leads to said high pressure inlet port of said pressure transfer device and which delivers a portion of the dilute stream exiting said first chamber in the PRO mode to said pressure transfer device, and wherein said feedstream delivery means comprises: (a) supply means which includes said low pressure pump for supplying a continuous stream of high salt concentration water to said low pressure inlet port of said pressure transfer device, (b) a first branch of said second conduit which is connected to said high pressure outlet port of said pressure transfer device, (c) a booster pump in said first branch, (d) a second branch of said second conduit which is connected to a source of saline water, and (e) a high pressure pump in said second branch.

7. The system according to claim 6 wherein said first conduit means contains a valve upstream of said hydroturbine that can be closed and wherein the system comprises a pair of shuttle valves which direct flow into and out of said first and second subchambers.

8. The system according to claim 6 wherein said second branch(d) of said second conduit contains a valve downstream of said high pressure pump that can be closed.

9. The system according to claim 6 wherein a supply pump is contained in said third conduit means, and said third conduit means contains a three-way valve for interconnecting said second subchamber with either said supply pump or said second discharge branch of said third conduit means.

10. The system according to claim 6 wherein said isobaric pressure transfer device is a rotary pressure transfer device.

11. A method for operating one system, at alternate times, either to produce high quality water from saline water that is supplied in an RO mode or to produce power from two aqueous streams of different salt concentrations that are supplied in a PRO mode, which method comprises the steps of:
providing a semipermeable membrane separation element capable of operating in either an RO or a PRO mode, which element has two subchambers that are separated by a semipermeable membrane, and a pair of ports connected respectively to each said subchamber; and
either in the PRO mode:
supplying an inlet liquid stream of a high salt concentration aqueous solution under a pressure which is not greater than about 90% of the osmotic pressure difference between said two aqueous streams to a first chamber of said subchambers,
supplying an inlet liquid stream of a low salt concentration aqueous solution to a second subchamber under low pressure so that water passes through the membrane to dilute the high salt concentration stream in said first subchamber, and
delivering at least some of a dilute liquid stream of amplified volume exiting said first subchamber to a hydroturbine power generator; or in the RO mode:
halting the supply of any inlet aqueous stream of low salt concentration,
supplying a continuous liquid stream of high salt concentration aqueous solution under a pressure of at least about 700 psig to the second subchamber of said semipermeable membrane element,
withdrawing a continuous stream of aqueous permeate from the first subchamber of said semipermeable membrane element,
withdrawing a continuous stream of brine from the second subchamber equal to a volume of at least about 40% of the inlet stream volume thereto, and
(a) directing said withdrawn stream of brine to the hydroturbine, and/or
(b) transferring the pressure of the withdrawn brine stream to raise the pressure of said high salt concentration liquid being supplied to the second subchamber.

12. The method according to claim 11 wherein an isobaric pressure transfer device having a high pressure inlet port, a low pressure inlet port, a high pressure outlet port and a low pressure outlet port is provided, wherein a major portion of said amplified volume stream is delivered in said PRO mode to the high pressure inlet port of the liquid pressure transfer device, wherein incoming high salt concentration liquid is supplied to said low pressure inlet port of said pressure transfer device and pressurized therein, and wherein the pressurized high salt concentration liquid from said high pressure outlet port of said pressure exchange device is delivered to said one of said subchambers as said incoming supply after further boosting the pressure thereof.

13. The method according to claim 12 wherein said isobaric pressure transfer device is a rotary pressure transfer device and wherein an amount equal to at least about 10% of the inlet flow of said low salt concentration stream is withdrawn from said second subchamber to avoid salt concentration polarization adjacent said semipermeable membrane.

14. The method according to claim 13 wherein said withdrawing of said low salt concentration stream includes diverting at least a part of said withdrawn stream to discharge.

15. The method according to claim 11 wherein said high pressure liquid is supplied to opposite subchambers of said separation element in the RO mode and in the PRO mode so that permeate flow through the semipermeable membrane in said element is in the same direction in both the RO and PRO modes.

16. A method for operating one system, at alternate times, to either produce high quality water from saline water that is supplied in an RO mode or to produce power from two aqueous streams of different salt concentrations that are supplied in a PRO mode, which method comprises the steps of:
providing a semipermeable membrane separation element capable of operating in either an RO or a PRO mode, which element has first and second liquid subchambers that are separated by semipermeable membrane, and pairs of ports connected respectively to each said subchamber;
providing a rotary liquid pressure transfer device having a high pressure inlet port, a low pressure inlet port, a high pressure outlet port and a low pressure outlet port;
supplying a continuous incoming liquid stream of high salt concentration aqueous solution to said low pressure inlet port of said pressure transfer device; and either in the PRO mode:
supplying a liquid feedstream of high salt concentration aqueous solution under a pressure which is not greater than about 90% of the osmotic pressure difference between said two aqueous streams to said first subchamber through a first port thereof,
supplying a continuous liquid stream of low salt concentration aqueous solution to the second subchamber of said element through a first port thereto under low pressure so that water passes through the membrane to dilute the high salt concentration stream in said first subchamber,
delivering a dilute stream of amplified volume exiting from a second port of the first subchamber partly to a hydroturbine power generator and partly to the high pressure inlet port of the rotary liquid pressure transfer device, and regulating the flow being delivered so that a volume of dilute liquid about equal to the volume that flows across the semipermeable membrane is directed to said hydroturbine which operates to generate power, with the remainder of said volume being directed to said high pressure inlet port, and
delivering the pressurized stream of high salt concentration aqueous solution from said high pressure outlet port of said rotary pressure exchange device to said first subchamber as said incoming supply; or in the RO mode:
halting the supply of any inlet aqueous stream of low salt concentration,
supplying a continuous liquid stream of high salt concentration aqueous solution under a pressure of at least about 700 psig to said second subchamber;
withdrawing a continuous stream of aqueous permeate from said first subchamber,
withdrawing a continuous stream of brine from said second subchamber equal to a volume of at least about 40% of the inlet stream volume thereto, directing said withdrawn stream of brine to the high pressure inlet port of the rotary pressure transfer device where it raises the pressure of said incoming stream of high salt concentration aqueous solution, and boosting the pressure of said stream exiting the high pressure outlet port of the rotary pressure transfer device and combining same with a makeup stream of high salt concentration aqueous solution to constitute said supply of high concentration aqueous solution to said second subchamber, whereby water permeates through the semipermeable membrane in the same direction in both the RO and PRO modes, so that in an RO mode high quality water is efficiently provided, and in a PRO mode power is generated.

17. The method according to claim 16 wherein said first subchamber of said separation element is drained when switching from the PRO mode to the RO mode.

18. The method according to claim 16 wherein said separation element is formed from spirally wound semipermeable membrane sheet material and wherein an amount equal to at least about 10% of the inlet flow to the second subchamber is withdrawn to avoid salt concentration polarization adjacent said semipermeable membrane.

19. The method according to claim 18 wherein said withdrawing from the second subchamber in the PRO mode includes diverting at least a part of said withdrawn stream to discharge.

* * * * *